Patented Aug. 6, 1929.

1,723,695

UNITED STATES PATENT OFFICE.

HANS HAHL AND LUDWIG SCHUTZ, OF ELBERFELD, GERMANY, ASSIGNORS, BY MESNE ASSIGNMENTS, TO WINTHROP CHEMICAL COMPANY, INC., OF NEW YORK, N. Y., A CORPORATION OF NEW YORK.

HEMOSTYPTIC COMPOUND.

No Drawing. Application filed August 27, 1923, Serial No. 659,657, and in Germany November 6, 1922.

It has been found that new and therapeutically valuable products can be obtained by treating sulfur containing compounds possessing the chemical character of mercaptans of the aromatic series with basic alkylaminoalkylhalides in the presence of an alkali. The new products have the probable general formula:

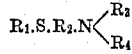

wherein $R_1$ represents a radicle including a carbon-containing cyclic nucleus, $R_2$ an alkylene group, and $R_3$ and $R_4$ alkyl groups. By the term "carbon-containing cyclic nucleus" we refer to aromatic as well as heterocyclic nuclei.

The products thus obtained possess a physiological effect upon the uterus and upon the blood vessels causing their contraction. They are therefore valuable substitutes for secale cornutum. They form neutral salts with acids which retain the above defined valuable properties and are soluble in water and can be used for subcutaneous injections.

The new products are generally yellowish oils soluble in alcohol forming crystallizing salts with acids.

In order to illustrate our new process more fully the following example is given, the parts being by weight:—6 parts of sodium are dissolved in 60 parts of alcohol and 60 parts of phenylthiobiazolonhydrosulfide are added. Subsequently 40 parts of chlorethyl-diethylamine are added. The reaction begins at the ordinary temperature and is accelerated by warming. The mixture is poured into water, the oil which precipitates is separated, dried and distilled. It is a thick oil having most probably the formula:

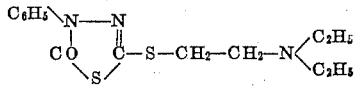

With hydrochloric acid it forms a salt which crystallizes from alcohol in the shape of white needles soluble in water and melting at 207–208° C. The aqueous solution can be used for subcutaneous injections.

Instead of phenylthiobiazolonhydrosulfide other of the above mentioned sulfur containing compounds possessing the chemical character of mercaptans e. g. thiophenol, metathiocresol, alpha-thionaphthol, and instead of chlorethyl diethylamine other alkylaminoalkyl-halides, e. g. ethylenebromide, can be used.

We claim:

1. As new products, compounds corresponding to the general formula:

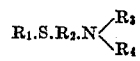

wherein R, represents a radicle including a carbon-containing cyclic nucleus, $R_2$ an alkylene group, and $R_3$ and $R_4$ alkyl groups, being generally oils soluble in alcohol and forming salts with acids, and being valuable substitutes for secale cornutum.

2. As new products, compounds corresponding to the general formula:

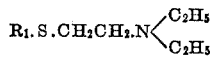

wherein $R_1$ represents a radicle including a carbon-containing cyclic nucleus, being generally oils soluble in alcohol and forming salts with acids, and being valuable substitues for secale cornutum.

3. As a new product, a compound corresponding to the formula:

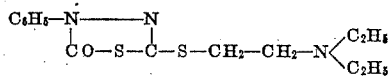

which is a thick oil soluble in alcohol forming a hydrochloride crystallizing from alcohol in the form of white needles melting at 207–208° C., and is a valuable substitute for secale cornutum.

4. A process for producing new sulfur-containing compounds, which comprises treating sulfur-containing compounds, of the group including compounds of the formula R—SH and the tautomeric formula

wherein R represents a radicle including a carbon-containing cyclic nucleus, with basic alkylaminoalkylhalides in the presence of an alkali.

5. A process for producing new sulfur-containing compounds, which comprises treating sulfur-containing compounds, of the group including compounds of the formula R—SH and the tautomeric formula

wherein R represents a radicle including a carbon-containing cylic nucleus, with chlorethyldiethylamine in the presence of an alkali.

6. A process for producing a new sulfur-containing compound, which comprises treating phenylthiobiazolonhydrosulfide with chlorethyldiethylamine in the presence of an alkali.

In testimony whereof we have hereunto set our hands.

HANS HAHL.
LUDWIG SCHÜTZ.